(12) United States Patent
Chhillar et al.

(10) Patent No.: US 9,236,953 B2
(45) Date of Patent: Jan. 12, 2016

(54) COORDINATION SYSTEMS AND METHODS BETWEEN DATA CONTROL PLANE AND PHOTONIC CONTROL IN OPTICAL NETWORKS

(71) Applicants: Mohit Chhillar, Delhi (IN); Anurag Prakash, Noida (IN); Rajagopalan Kannan, Gurgaon (IN); Dominic Richens, Ottawa (CA); Hari Srinivasan, Gurgaon (IN)

(72) Inventors: Mohit Chhillar, Delhi (IN); Anurag Prakash, Noida (IN); Rajagopalan Kannan, Gurgaon (IN); Dominic Richens, Ottawa (CA); Hari Srinivasan, Gurgaon (IN)

(73) Assignee: Ciena Corporation, Hanover, MD (US)

(*) Notice: Subject to any disclaimer, the term of this patent is extended or adjusted under 35 U.S.C. 154(b) by 65 days.

(21) Appl. No.: 14/247,320

(22) Filed: Apr. 8, 2014

(65) Prior Publication Data

US 2015/0244470 A1    Aug. 27, 2015

(30) Foreign Application Priority Data

Feb. 25, 2014   (IN) .............................. 528/DEL/2014

(51) Int. Cl.
| | |
|---|---|
| *H04B 10/00* | (2013.01) |
| *H04B 10/70* | (2013.01) |
| *H04J 14/02* | (2006.01) |
| *H04Q 11/00* | (2006.01) |
| *H04B 10/032* | (2013.01) |

(52) U.S. Cl.
CPC .............. *H04B 10/70* (2013.01); *H04B 10/032* (2013.01); *H04J 14/0295* (2013.01); *H04Q 11/0066* (2013.01); *H04Q 2011/0081* (2013.01); *H04Q 2011/0086* (2013.01)

(58) Field of Classification Search
USPC .............................................. 398/140, 45–57
See application file for complete search history.

(56) References Cited

U.S. PATENT DOCUMENTS

| | | | |
|---|---|---|---|
| 7,512,674 B1 | 3/2009 | Jain et al. | |
| 7,747,165 B2* | 6/2010 | Emery et al. ..................... | 398/30 |
| 8,165,466 B2* | 4/2012 | Emery et al. ..................... | 398/30 |
| 8,346,079 B2* | 1/2013 | Lee et al. ......................... | 398/49 |
| 8,433,192 B2 | 4/2013 | Frankel et al. | |
| 8,666,246 B2* | 3/2014 | Lee et al. ......................... | 398/48 |
| 8,666,247 B2 | 3/2014 | Srinivasan et al. | |
| 8,682,160 B2 | 3/2014 | Prakash et al. | |
| 8,923,695 B2* | 12/2014 | Lee et al. ......................... | 398/45 |
| 8,971,706 B2* | 3/2015 | Gerstel et al. ................... | 398/57 |
| 2002/0191241 A1* | 12/2002 | Emery et al. .................. | 359/109 |
| 2004/0008988 A1* | 1/2004 | Gerstal et al. ................... | 398/45 |
| 2009/0190497 A1 | 7/2009 | Peloso et al. | |
| 2010/0142943 A1* | 6/2010 | Frankel et al. .................. | 398/25 |
| 2010/0247096 A1* | 9/2010 | Emery et al. ..................... | 398/30 |

(Continued)

*Primary Examiner* — Agustin Bello
(74) *Attorney, Agent, or Firm* — Clements Bernard PLLC; Christopher L. Bernard; Lawrence A. Baratta, Jr.

(57) ABSTRACT

A method, a system, and a network for coordination between a data control plane and photonic control in a network include operating the data control plane with photonic control messaging included therein, wherein the data control plane is configured to at least establish end-to-end paths between a plurality of network elements at Layer 1; transmitting a photonic control message in or by the data control plane responsive to a requirement for photonic layer information; processing, via the data control plane, the photonic layer information received from photonic control responsive to the photonic control message, wherein the photonic control is configured to adjust photonic hardware responsive to a change at a photonic layer; and performing an action by the data control plane considering the photonic layer information.

19 Claims, 6 Drawing Sheets

(56) References Cited

U.S. PATENT DOCUMENTS

| | | |
|---|---|---|
| 2012/0106948 A1* | 5/2012 | Moynihan et al. ............. 398/10 |
| 2012/0177364 A1* | 7/2012 | Beller ............................ 398/16 |
| 2012/0237212 A1 | 9/2012 | Nishihara et al. |
| 2012/0294610 A1* | 11/2012 | Genthner et al. ............. 398/45 |
| 2013/0177305 A1 | 7/2013 | Prakash et al. |
| 2013/0177311 A1 | 7/2013 | Trnkus et al. |
| 2013/0236169 A1 | 9/2013 | Gaudette et al. |
| 2013/0266312 A1 | 10/2013 | Prakash et al. |
| 2013/0308948 A1 | 11/2013 | Swinkels et al. |
| 2014/0169783 A1* | 6/2014 | Surek ............................ 398/10 |

* cited by examiner

COORDINATION SYSTEMS AND METHODS BETWEEN DATA CONTROL PLANE AND PHOTONIC CONTROL IN OPTICAL NETWORKS

CROSS-REFERENCE TO RELATED APPLICATION

The present patent application/patent claims the benefit of priority of Indian Patent Application No. 528/DEL/2014, filed on Feb. 25, 2014, and entitled "COORDINATION SYSTEMS AND METHODS BETWEEN DATA CONTROL PLANE AND PHOTONIC CONTROL IN OPTICAL NETWORKS," the contents of which are incorporated in full by reference herein.

FIELD OF THE DISCLOSURE

The present disclosure relates generally to optical networking systems and methods. More particularly, the present disclosure relates to coordination systems and methods between a data control plane such as, for example, Automatically Switched Optical Network (ASON), Generalized Multi-Protocol Label Switching (GMPLS), Optical Signaling and Routing Protocol (OSRP), and the like, and photonic control which can include a photonic control plane or loop in optical networks.

BACKGROUND OF THE DISCLOSURE

In optical networks, optical control planes (or simply control planes as referred to herein) provide automatic allocation of network resources in an end-to-end manner. Exemplary control planes may include Automatically Switched Optical Network (ASON) as defined in G.8080/Y.1304, Architecture for the automatically switched optical network (ASON) (February 2005), the contents of which are herein incorporated by reference; Generalized Multi-Protocol Label Switching (GMPLS) Architecture as defined in Request for Comments (RFC): 3945 (October 2004) and the like, the contents of which are herein incorporated by reference; Optical Signaling and Routing Protocol (OSRP) from Ciena Corporation which is an optical signaling and routing protocol similar to PNNI (Private Network-to-Network Interface) and MPLS; or any other type control plane for controlling network elements at one or more layers, and establishing connections there between. As described herein, these control planes may be referred to as data control planes as they deal with routing signals at Layer 1, i.e. time division multiplexing (TDM) signals such as, for example, Synchronous Optical Network (SONET), Synchronous Digital Hierarchy (SDH), Optical Transport Network (OTN), Ethernet, and the like.

Conventionally, in the data control planes, a network path is considered to be available for a connection based on availability of nodes, links and sufficient bandwidth thereon. Examples of end-to-end signaled paths in control planes include sub-network connections (SNCs) in ASON or OSRP and label switched paths (LSPs) in GMPLS. All control planes use the available paths to route the services and program the underlying hardware. As services are added into photonic networks, i.e. the wavelength division multiplexing (WDM) layer, photonic hardware, such as amplifiers, variable optical attenuators, etc., needs to be re-tuned or adjusted to accommodate the new services. That is, as the number of wavelengths on a link changes, the hardware requires re-tuning for the new power levels. To support wavelength changes, the photonic layer can include photonic control which, similar to the data control plane, can be referred to as a control plane or control loop which operates on the photonic hardware to optimize power settings and the like. Due to limitations of the photonic hardware, launched power, and modem type, a Layer 0 network (WDM) may or may not be able to handle the new service request at the data layer from the data control plane and may impact the existing services on the network.

Photonic control and data control planes conventionally are separate or loosely connected. By separate, these components have no interaction. For example, the data control plane simply performs data path computation based on available timeslots and/or wavelengths without regard to photonic layer setup. By loosely connected, the data control plane can perform data path computation with knowledge of wavelength count, loss, non-linear effects, etc. from a static perspective, i.e. the data control plane does a calculation for the photonic layer based on known variables. However, there is no real-time coordination conventionally. For example, the data control plane can, based on its knowledge of links and nodes, make a decision to route a service which from the perspective the photonic hardware may not be able to handle the service requests. An example of this can include where the photonic control is currently re-tuning a link and the photonic control cannot add or remove a wavelength until this process is complete. Thus, this link may look available in real-time to the data control plane, but is currently unavailable due to concurrent photonic control operation. Thus, there is a need for coordination systems and methods between a data control plane and photonic control.

BRIEF SUMMARY OF THE DISCLOSURE

In various exemplary embodiments, coordination systems and methods are described between a data control plane such as, for example, Automatically Switched Optical Network (ASON), Generalized Multi-Protocol Label Switching (GMPLS), Optical Signaling and Routing Protocol (OSRP), and the like, and photonic control which can include a photonic control plane or loop in optical networks. In an exemplary embodiment, the coordination systems and methods use the signaling power of the control plane to determine datapath state, from a photonic perspective, on existing and potential services. This information can be used in various ways such as for protect path validations, redial possibility, network integrity, and the like. For example, from the data control plane, services can be routed to only those paths/links which can handle the extra provisioning and bring the traffic up, based on the photonic control. The systems and methods can monitor the traffic state for a service on a periodic basis, through the coordination. The traffic state cannot be determined by looking at other link parameters in the path. Also the traffic state is service dependent and will be per service basis and not a link characteristic.

In an exemplary embodiment, a method for coordination between a data control plane and photonic control in a network includes operating the data control plane with photonic control messaging included therein, wherein the data control plane is configured to at least establish end-to-end paths between a plurality of network elements at Layer 1; transmitting a photonic control message in or by the data control plane responsive to a requirement for photonic layer information; processing, via the data control plane, the photonic layer information received from photonic control responsive to the photonic control message, wherein the photonic control is configured to adjust photonic hardware responsive to a change at a photonic layer; and performing an action by the data control plane considering the photonic layer information.

In another exemplary embodiment, a system for coordination between a data control plane and photonic control in a network includes a processor communicatively coupled to memory; and instructions stored in the memory that, when executed, cause the processor to: operate the data control plane with photonic control messaging included therein, wherein the data control plane is configured to at least establish end-to-end paths between a plurality of network elements at Layer 1; cause transmission of a photonic control message in or by the data control plane responsive to a requirement for photonic layer information; process the photonic layer information received from photonic control responsive to the photonic control message, wherein the photonic control is configured to adjust photonic hardware responsive to a change at a photonic layer; and cause an action in the data control plane considering the photonic layer information.

In yet another exemplary embodiment, a network includes with coordination between a data control plane and photonic control includes a plurality of network elements collectively operating the data control plane therebetween, wherein the data control plane is configured to at least establish end-to-end paths between the plurality of network elements at Layer 1; a plurality of links interconnecting the plurality of network elements at a photonic layer and with the photonic control operating thereon; and signaling in the data control plane for coordination with the photonic control, wherein the signaling is utilized to: process photonic layer information received from the photonic control responsive to a photonic control message, wherein the photonic control is configured to adjust photonic hardware responsive to a change at a photonic layer; and cause an action in the data control plane considering the photonic layer information.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, coordination systems and methods are described between a data control plane such as, for example, Automatically Switched Optical Network (ASON), Generalized Multi-Protocol Label Switching (GMPLS), Optical Signaling and Routing Protocol (OSRP), and the like, and photonic control which can include a photonic control plane or loop in optical networks. In an exemplary embodiment, the coordination systems and methods use the signaling power of the control plane to determine datapath state, from a photonic perspective, on existing and potential services. This information can be used in various ways such as for protect path validations, redial possibility, network integrity, and the like. For example, from the data control plane, services can be routed to only those paths/links which can handle the extra provisioning and bring the traffic up, based on the photonic control. The systems and methods can monitor the traffic state for a service on a periodic basis, through the coordination. The traffic state cannot be determined by looking at other link parameters in the path. Also the traffic state is service dependent and will be per service basis and not a link characteristic.

Figure 1:
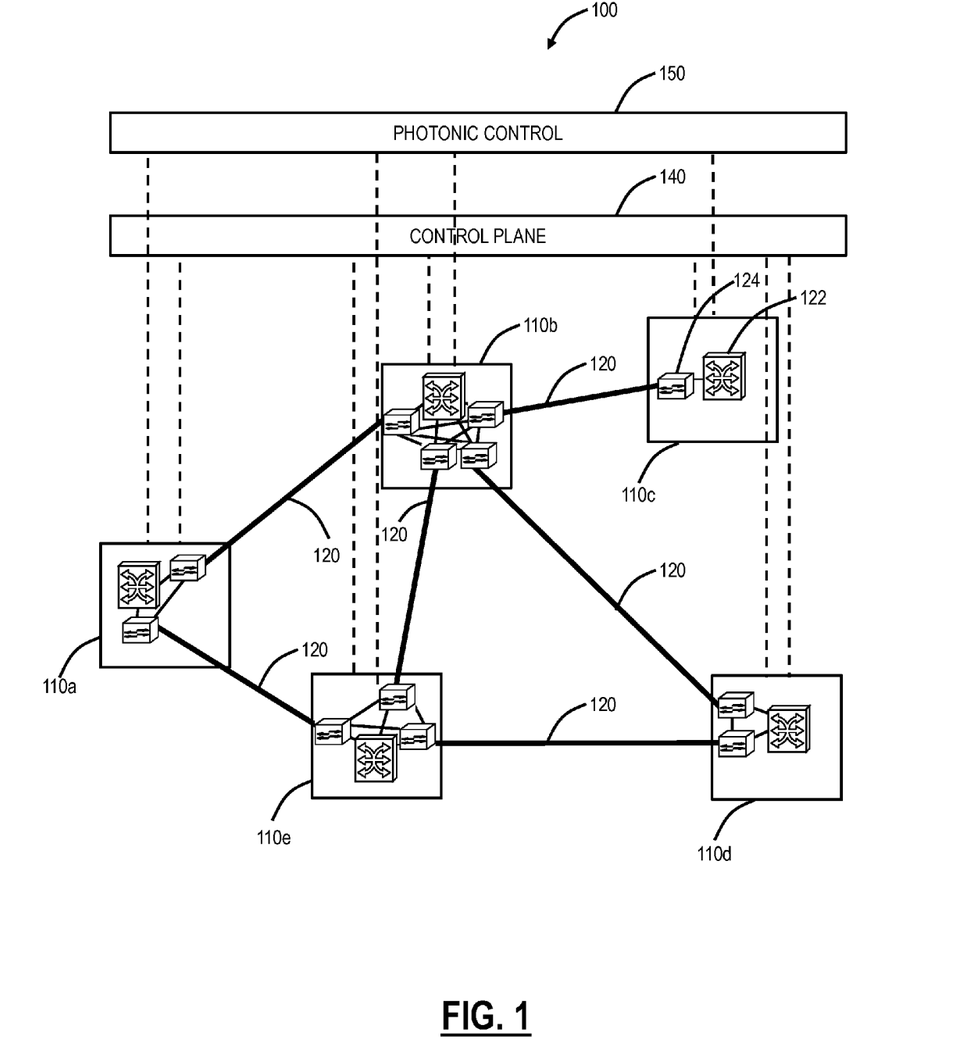
FIG. 1 is a network diagram of an exemplary network with five interconnected sites.
Figure 6:
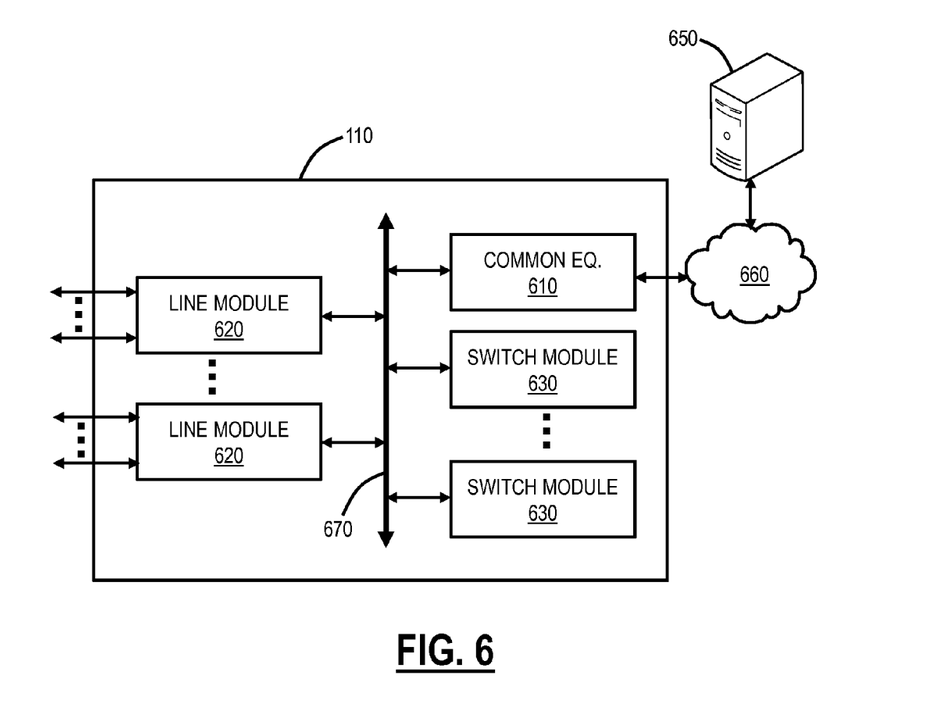
FIG. 6 is a block diagram of an exemplary node for use with the methods and systems described herein.

Referring to FIG. 1, in an exemplary embodiment, a network diagram illustrates an exemplary network 100 with five interconnected sites 110a, 110b, 110c, 110d, 110e. The sites 110 are interconnected through a plurality of links 120. Each of the sites 110 can include a switch 122 and one or more WDM network elements 124. The switch 122 is configured to provide services at Layers 1 (e.g., OTN/SONET/SDH) and/or Layer 2 (e.g., Ethernet) and can operate the data control plane. The WDM network element 124 provides the photonic layer (e.g., Layer 0) and various functionality associated therewith (e.g., multiplexing, amplification, optical routing, etc.) including the photonic control. Of note, while shown separately, those of ordinary skill in the switch 122 and the WDM network elements 124 may be realized in a same network element. The photonic layer and the photonic control operating thereon can also include intermediate amplifiers and/or regenerators on the links 120 which are omitted for illustration purposes.

The sites 110 communicate with one another optically over the links 120. The sites 110 can be network elements which include a plurality of ingress and egress ports forming the links 120. Further, the nodes 110 can include various degrees, i.e. the site 110c is a one degree node, the sites 110a, 110d are two degree nodes, the site 110e is a three degree node, and the site 110b is a four degree node. The number of degrees is indicative of the number of adjacent nodes at each particular node. An exemplary structure of the switch 122 is illustrated in FIG. 6. The network 100 includes a connection 130 with ingress/egress at the sites 110a, 110c and intermediate sites 110b, 110e. The connection 130 can be a sub-network connection (SNC) (or an LSP). The connection 130 is an end-to-end path or an end-to-end signaled path and from the view of the client signal contained therein, it is seen as a single network segment. From the data control plane perspective, the connection 130 is an SNC or LSP, and from the photonic control perspective, the connection 130 is a wavelength or part of a wavelength. The network 100 is illustrated, for example, as an interconnected mesh network, and those of ordinary skill in the art will recognize the network 100 can include other architectures, with additional sites 110 or with less nodes sites, with additional network elements and hardware, etc.

The network 100 includes a data control plane 140 operating on and/or between the switches 122 at the sites 110a, 110b, 110c, 110d, 110e. The data control plane 140 includes software, processes, algorithms, etc. that control configurable features of the network 100, such as automating discovery of the switches 122, capacity on the links 120, port availability on the switches 122, connectivity between ports; dissemination of topology and bandwidth information between the switches 122; calculation and creation of paths for connections; network level protection and restoration; and the like. In an exemplary embodiment, the data control plane 140 can utilize ASON, GMPLS, OSRP, or the like. Those of ordinary skill in the art will recognize the network 100 and the data control plane 140 can utilize any type control plane for controlling the switches 122 and establishing connections therebetween.

In the terminology of ASON and OSRP, sub-network connections (SNC) are end-to-end signaled paths since from the point of view of a client signal, each is a single network segment. In GMPLS, the SNCs are an end-to-end path referred to as a label switched path (LSP). For example, LSPs for GMPLS are described in draft-ietf-ccamp-gmpls-ospf-g709v3-13, "Traffic Engineering Extensions to OSPF for Generalized MPLS (GMPLS) Control of Evolving G.709 OTN Networks," (Dec. 11, 2013), the contents of which are incorporated by reference herein. In the various descriptions herein, reference is made to SNCs for illustration only of an exemplary embodiment. Those of ordinary skill in the art will recognize that SNCs and LSPs can both be used with the systems and methods described herein for end-to-end paths. That is, for GMPLS-based systems, the connection 130 would be referred to as an LSP or an ODU LSP. The term end-to-end path as used herein may refer to an SNC, an LSP, etc. and an optical control plane may include ASON, OSRP, GMPLS, etc.

Service routing in the data control plane 140 is well known. A path (e.g., SNC or LSP) is considered valid for connection setup based on the availability of the switch 122, the links 120, and sufficient bandwidth available thereon. Photonic networks, i.e. Layer 0 and the wavelength interconnectivity of the WDM network elements 124, have additional complexity for successfully setting up a service up. This requires that all Layer 0 services be pre-planned and/or managed manually. For example, potential paths for services at the photonic layer can be pre-planned by modeling them offline using a static snapshot of the network state to ensure that the computed paths are optically viable.

The network 100 can include photonic control 150 which can be viewed as a control plane and/or control algorithm/loop for managing wavelengths from a physical perspective at Layer 0. In photonic services, optical characteristics play an important part in determining the state of traffic. The state of an existing service, at Layer 0, may get impacted by change in network behavior, change in number of services on the path and fiber characteristics. Thus, the photonic control 150 provides photonic control loops that take care of these changes through automated adjustments to photonic hardware (e.g., variable optical attenuators (VOAs), amplifiers (EDFAs), etc.). That is, the photonic control 150 is configured to automatically set various parameters of the photonic hardware to be in a nominal operating range (e.g., in terms of power) given a number of equipped wavelengths and operating parameters (e.g., loss, dispersion, and non-linear effects). Of note, it is also possible the parameters of the photonic hardware have reached their saturation on some or all of the photonic hardware. Also, it is possible the photonic control 150 is presently running re-tuning on one or more of the links 120 in which case those links 120 are not available to add/remove wavelengths during the re-tuning. This needs to be communicated between the photonic control 150 and the data control plane 140 as well as providing systems and methods which can repetitively check on the network integrity for the service.

An example of the photonic control 150 is described in commonly-assigned U.S. Pat. No. 8,364,036, filed Apr. 27, 2006, issued Jan. 29, 2013, by Boertjes et al., and entitled "METHOD AND SYSTEM FOR CONTROLLING OPTICAL NETWORKS," the contents of which are incorporated by reference herein. The photonic control 150 is generally implemented on any of the links 120 whenever there is a change (e.g., addition or removal of wavelengths, operating power changes in hardware, etc.). The purpose of the photonic control 150 is path stabilization and can include various automatic control loops which optimize power settings to find a nominal operating range. One constraint of the photonic control 150 is that a change cannot be made to a link 120 that is currently operating the photonic control 150 for adjustments. For example, an adjustment operation of the photonic control 150 can take seconds or even minutes thereby preventing any new wavelengths from being added or removed. This needs to be communicated to the data control plane 140. Another constraint of the photonic control 150 is that the photonic hardware may be at saturation and therefore unable to handle more wavelengths from the perspective of the photonic control 150. Again, this needs to be communicated to the data control plane 140.

Figure 2:
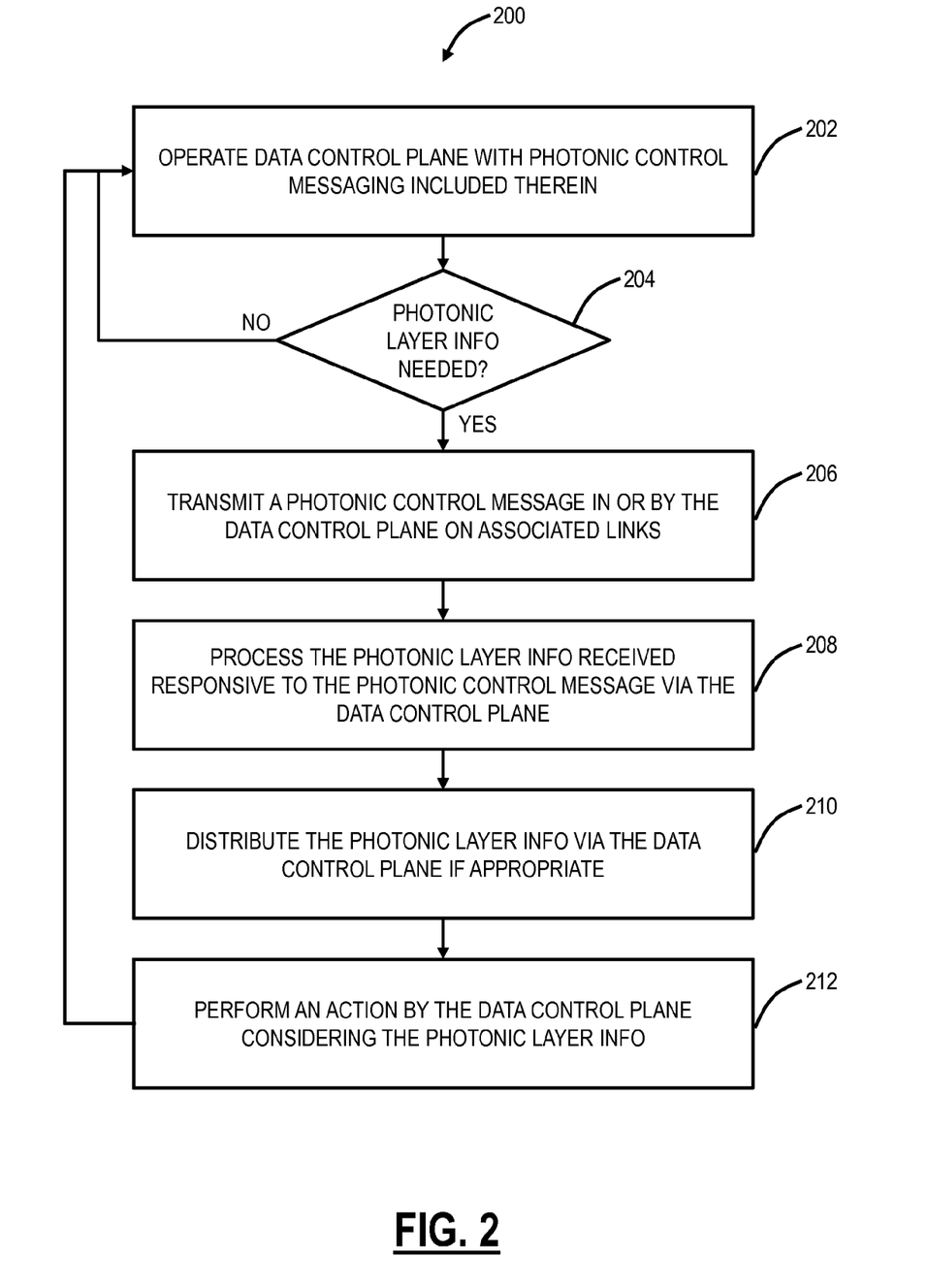
FIG. 2 is a flowchart of a coordination method between a data control plane and a photonic control in the network of FIG. 1.

Referring to FIG. 2, in an exemplary embodiment, a flowchart illustrates a coordination method 200 between the data control plane 140 and the photonic control 150. The coordination method 200 contemplates operation in the network 100 by and between the switches 122 and/or the WDM network elements 124 over the links 120 as well as other optical networking equipment. The coordination method 200 includes operating the data control plane with photonic control messaging included therein (step 202). As described herein, the data control plane 140 is configured to at least establish end-to-end paths between a plurality of network elements at Layer 1 and can include ASON, OSRP, GMPLS, etc. The coordination method 200 can determine if photonic layer information is needed (step 204), and if not, return to the step 202. For example, photonic layer information may be needed for protection path validation, redialing of different legs of a subnetwork connection protection (SNCP), network integrity checking, and the like. The requested photonic layer information can include, without limitation, fiber types of the links 120, optical modem types, current operating settings of photonic hardware (e.g., VOAs, amplifiers, etc.), current operating conditions of the links (e.g., number of wavelengths, power levels, bit error rates, optical signal-to-noise ratio (OSNR), Q, and the like), operational state of any current adjustments on the links 120, etc.

If the photonic layer information is needed (step 204), the coordination method 200 includes transmitting a photonic control message in or by the data control plane responsive to a requirement for photonic layer information (step 206). The photonic control messaging and the photonic control message includes an ability of the data control plane 140 to transmit a message, e.g. a pilot signal, (or request information via a message to the photonic control 150) that traverses appropriate links 120 and gathers or instructs the photonic control 150 to provide photonic layer information. It is important to note that some of the requested photonic layer information is consistently changing such as the current operating settings (changes based on an adjustment), the current operating conditions of the links (could change more often than the current operating settings), and the operational state of any current adjustments on the links 120 (changes whenever a new adjustment is required). As such, it is important for the data control plane to pull this information from the photonic control when needed (as opposed to operating with older data that may not be current).

The coordination method 200 can include processing, via the data control plane, the photonic layer information received from photonic control responsive to the photonic control message (step 208). Again, the photonic control is configured to adjust photonic hardware responsive to a change at a photonic layer. Here, the coordination method 200 has insight into the current optical conditions of the links 120 for consideration in any routing decisions. Optionally, the coordination method 200 includes distributing the photonic layer information via the data control plane if appropriate step 210). Here, the data control plane can use its existing topology distribution algorithms or the like to flood this information to other nodes. Finally, the coordination method 200 includes performing an action by the data control plane considering the photonic layer information (step 212). Based on the photonic layer information, the data control plane will have a view as to whether or not specific links 120 are currently optically viable. By optically viable, this means the links 120 can accept one or more new wavelengths or remove one or more wavelengths.

In the foregoing descriptions, three exemplary applications and associated actions are described with respect to the coordination method 200. For example, the three exemplary applications can include protection path validation, redialing of different legs of a subnetwork connection protection (SNCP), and network integrity checking. Those of ordinary skill in the art will recognize the coordination method 200 contemplates other applications and uses for coordinating information exchange between two disparate control planes—the data control plane 140 and the photonic control 150. For example, the coordination method 200 can include determining the requirement as one of protection path validation, redialing of different legs of a subnetwork connection protection (SNCP), and network integrity checking. The coordination method 200 can include determining a path in the network is currently optically viable based on the photonic layer information; and performing the action comprising adding or removing a wavelength on the path based on the path being currently optically viable. Here, the wavelength change is only made based on the photonic control determining the path is currently optically viable, i.e. not in a re-tuning mode and able to support the wavelength change based on the photonic hardware configuration. The coordination method 200 can further include determining a path in the network is not currently optically viable based on the photonic layer information; and performing the action comprising preventing adding or removing a wavelength on the path based on the path not being currently optically viable.

Protection Path Validation

The data control plane 140 is configured to compute paths, e.g. SNCs, LSPs, etc., in the network 100. Such a computation may be done responsive to a failure to determine restoration paths as well as having pre-computed restoration paths. A protection path calculation needs to be done to take into account various dimensions for setting up of traffic, including whether a link 120 is currently optically viable or not. It also needs to take care of all services which can potentially share the path and links. The coordination method 200 can lead to a more pragmatic protection path calculation. With respect to protection path validation, the coordination method 200 can be used to send a pilot signal (e.g., the photonic control message) on the protect path and collect the photonic layer information as path guiding parameters to apply as part of protection path calculations. The pilot signal may also contain information about other services which can potentially take same path or adjoint links. From this one can determine the Protect Paths across different SNCs or LSPs such as from a path computation element (PCE) application and feed it to the data control plane 140. This can also be determined by shared risk link groups (SRLG) and other common point of failures.

Again, as described herein, potential paths for services are pre-planned by modeling them offline using a static snapshot of the network state to ensure that the computed paths are optically viable. Alternatively the network elements or a PCE can compute paths themselves, based on dynamic link-state information. The coordination method 200 provides a mechanism to determine, for pre-computed or dynamically computed paths, whether or not such paths are currently optically viable. This can be used when service restoration and re-grooming is triggered on a network element to guarantee that the new path is still optically viable at the current time.

In a typical network, the data control plane 140 can calculate many different paths together such as due to a SRLG or simply because the network has a large number of SNCs, LSPs, etc. There are multiple criteria for routing decisions such as administrative weight, bandwidth availability, etc. Again, paths can be pre-computed and/or dynamically computed, and while they may be optically viable when computed, they may not be when the data control plane 140 seeks to route traffic on them, e.g. an action to add a wavelength. With the coordination method 200, the data control plane 140 can keep track of whether pre-computed paths are currently optically valid as well as check with dynamically computed paths.

Figure 3:
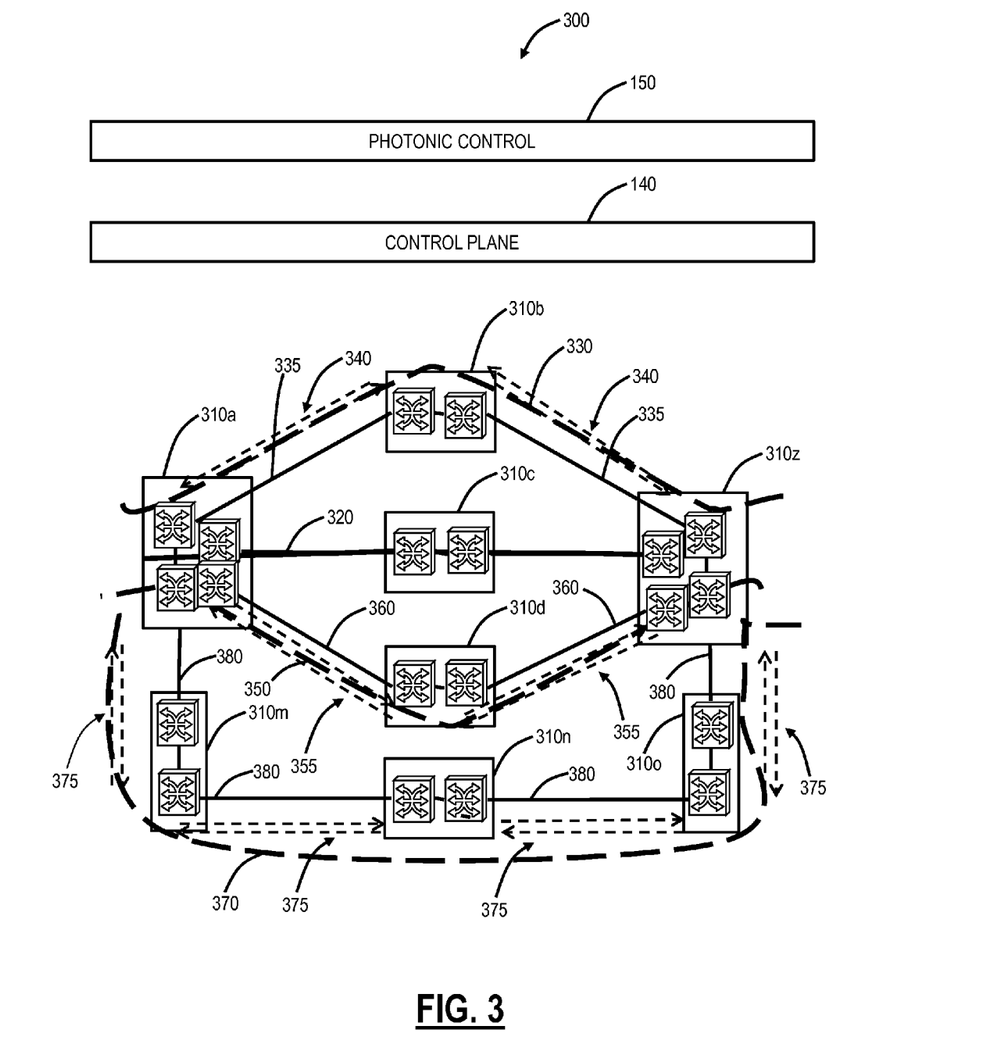
FIG. 3 is a network diagram illustrates a network illustrating protection path validation with the coordination method of FIG. 2.

Referring to FIG. 3, in an exemplary embodiment, a network diagram illustrates a network 300 for protection path validation with the coordination method 200. The network 300 includes sites 310a, 310b, 310c, 310d, 310m, 310n, 310o, 310z which can include various network elements located therein such as, for example, the switches 122, the WDM network elements 124, etc. The network 300 is utilized to describe an exemplary operation of the coordination method 300, and the network 300 includes the data control plane 140 and the photonic control 150. First, the data control plane 140 establishes a first path 320 between the sites 310a, 310c, 310z as a working path. This can include first utilizing the coordination method 200 ensuring the first path 320 is optically viable before establishing service.

Next, the data control plane 140 calculates a first protect path 330 between the sites 310a, 310b, 310z. The data control plane 140 can send pilot signals 335 (denoted by dashed arrowed lines) on links 340 between the sites 310a, 310b and the sites 310b, 310z. The pilot signals 335 are the photonic control messages of the coordination method 200 and provide information to the control plane 140 from the photonic control 150 concerning the operational state and viability of the links 340. In this example, it is assumed the links 340 are viable, and the data control plane 140 makes note of this that the first protection path 330 is currently optically viable. The data control plane 140 can periodically send the pilot signals 335 and update the current optical validity of the links 340. With this, the data control plane 140 is aware of whether or not the first protection path 330 is available.

Next, the data control plane 140 calculates a second protect path 350 between the sites 310a, 310d, 310z. Similar to the first protect path 330, the data control plane 140 can send pilot signals 355 (denoted by dashed arrowed lines) on links 360 between the sites 310a, 310d and the sites 310d, 310z. The pilot signals 355 are the photonic control messages of the coordination method 200 and provide information to the control plane 140 from the photonic control 150 concerning the operational state and viability of the links 360. In this example, it is assumed the links 360 are viable, and the data control plane 140 makes note of this that the second protection path 350 is currently optically viable. The data control plane 140 can periodically send the pilot signals 355 and update the current optical validity of the links 360. With this, the data control plane 140 is aware of whether or not the second protection path 350 is available.

Finally, the data control plane 140 calculates a third protect path 370 between the sites 310a, 310m, 310n, 310o, 310z. Again, the data control plane 140 can send pilot signals 375 (denoted by dashed arrowed lines) on links 380 between the sites 310a, 310m, the sites 310m, 310n, the sites 310n, 310o, and the sites 310o, 310z. The pilot signals 375 are the photonic control messages of the coordination method 200 and provide information to the control plane 140 from the photonic control 150 concerning the operational state and viability of the links 380. In this example, it is assumed the links 380 are not viable, and the data control plane 140 makes note of this that the third protection path 370 is not currently optically viable. The data control plane 140 can periodically send the pilot signals 375 and update the current optical validity of the links 380. With this, the data control plane 140 is aware of whether or not the third protection path 370 is available.

Redialing of Different Legs of a Subnetwork Connection Protection (SNCP)

SNCP is a type of protection mechanism that provides 1+1 protection with extremely fast switching times, e.g. less than 50 msec, for high priority traffic, as well as providing a mechanism for multiple fiber failures. With respect to the network 100 and optical validity, for a SNCP Configuration (two SNCs protecting each other) a manual operation (Re-Groom/Auto Revert/Manual Revert/Manual Switch To Protect) on the protect leg should be blocked until the working leg starts carrying traffic faultlessly/impeccably. Otherwise the user would not be guaranteed sub 50 msec switch. For the cases where mesh restoration timings are higher than 50 msec, especially in Layer 0 networks where the best timings span in scores of seconds. In operation, a protect path or leg of a SNCP configuration should be set up/redialed once it is determined that traffic is up and running on the other path or leg. Time to redial takes from 20 sec to 100 sec on various photonic systems in industry. In case an auto revert or a manual operation is planned this would lead to both legs be down simultaneously.

Figure 4:
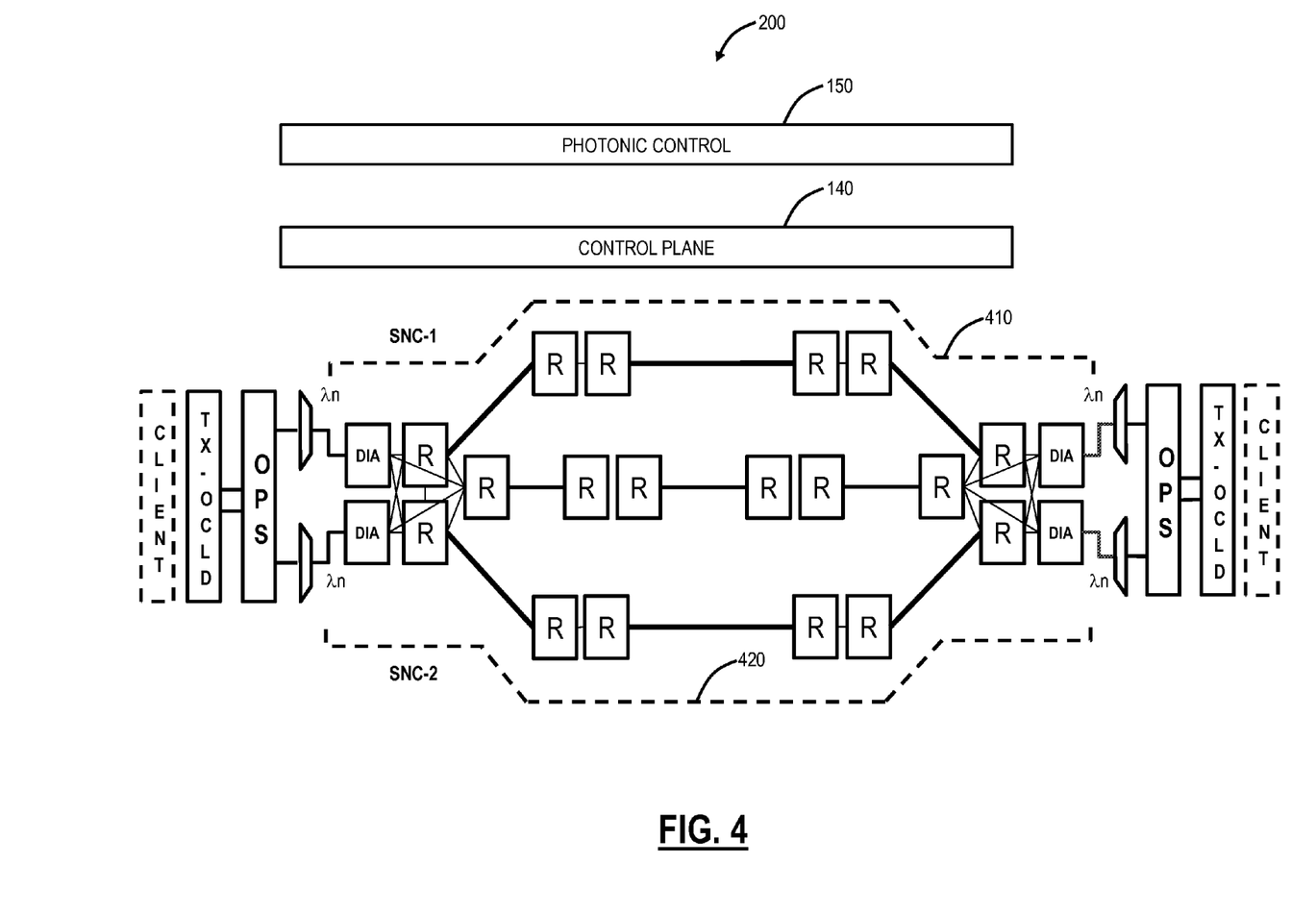
FIG. 4 is a network diagram illustrates a network showing redialing of different legs of a SNCP with the coordination method of FIG. 2.

Referring to FIG. 4, in an exemplary embodiment, a network diagram illustrates a network 400 showing redialing of different legs of a SNCP with the coordination method 200. The network 400 includes two SNCs 410, 420 which are each a leg for a SNCP connection. Again, the SNCP provides 1+1 sub 50 msec switching. For example, assume the SNC 410 is the working leg, and the SNC 420 is the protection leg. Upon a switch to the SNC 420, the network 400 will switch back or revert to the SNC 410 when it is back up. As part of distributed control via the data control plane 140, service state is determined by the control path information, but for Layer 0, it depends on reinitializing powers for existing and new services, which can take minutes. Here, the Layer 0 control path information is determined via the coordination method 200. It makes sense to hold the controlled redial of one leg if the other leg is not ready to carry traffic seamlessly. For example, Re-groom, Auto Revert, Manual Revert, TODR, Manual Switch To Protect fall in the scenario of controlled redials. The Validity of the path depends on Fiber Type, Modem Type and existence of other services on the domains.

Network Integrity Check

With respect to photonic services, a node's optical characteristics play an important part in determining the state of traffic. The state of existing services may get impacted by changes in network behavior, changes in number of services on the path and fiber characteristics, etc. Photonic control loops, such as the photonic control, take care of these changes but it possible that the photonic hardware (e.g., VOAs and amplifiers) have reached their saturation. Here, the coordination method 200 can be used to periodically and can repetitively check on the network integrity for the services. With the coordination method 200, signaling can be used to perform a network integrity check on different services and reroute data if required. For example, the data control plane 140 can reroute to remove wavelengths on links that may be saturated to reduce the load on these links. Note, the network integrity check can be used with the other exemplary embodiments described herein, and the data control plane 140 can maintain updated link states based on the photonic information received.

Figure 5:
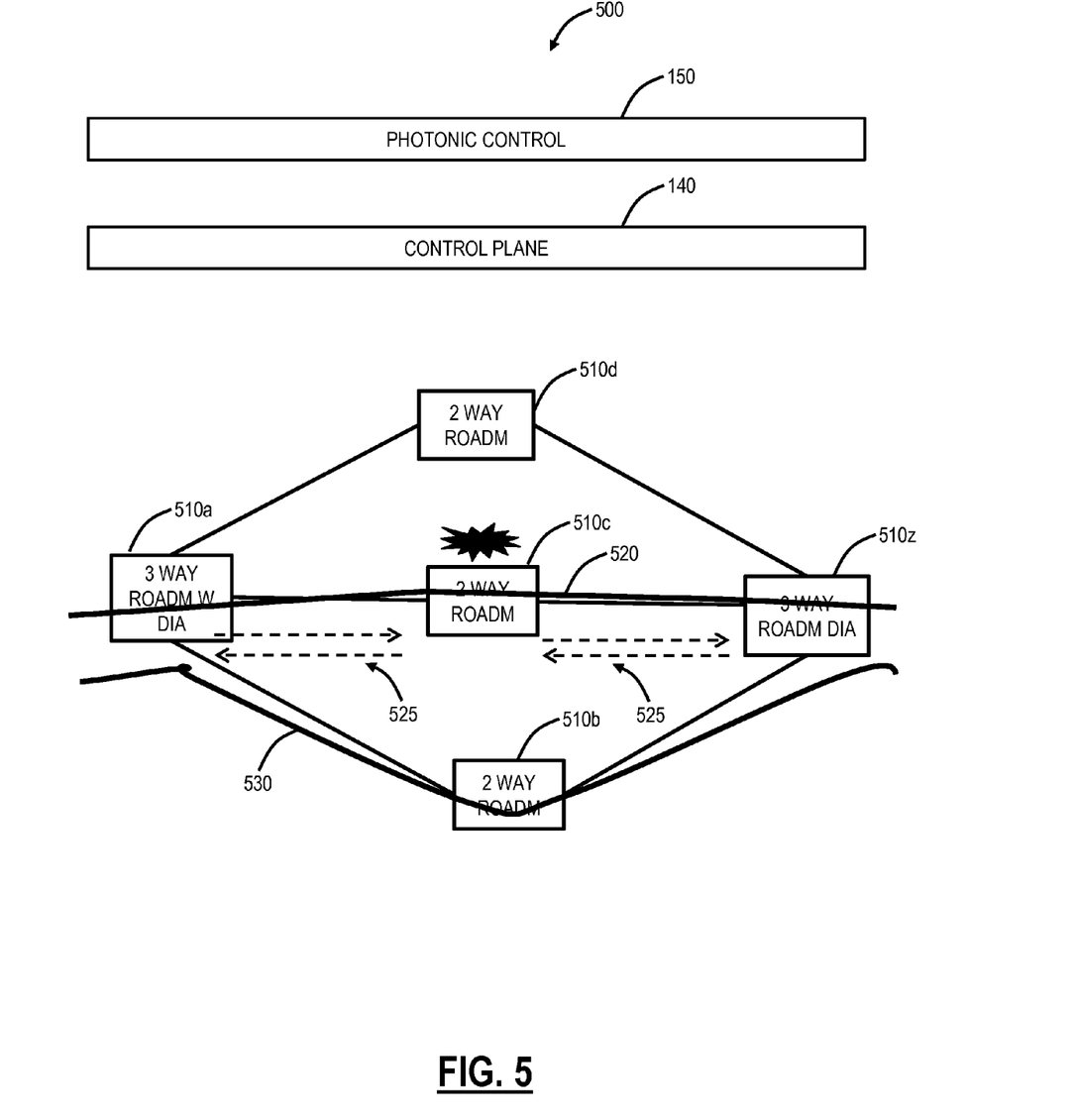
FIG. 5 is a network diagram of a network showing a network integrity check using the coordination method of FIG. 2.

Referring to FIG. 5, in an exemplary embodiment, a network diagram illustrates a network 500 showing a network integrity check using the coordination method 200. The network 500 includes nodes 510a, 510b, 510c, 510d, 510z. Initially, there is a service 520 between the nodes 510a, 510c, 510z. The data control plane 140 may start to experience some issues leading to a traffic hit on the service 520. Concurrently, the source node 510s is periodically sending pilot signals 525 via the coordination method 200. On getting this information and responsive to the service hit, the data control plane 140 can redial to a service 530 knowing this service is optically viable. Advantageously, the coordination method 200 provides ways to include the datapath feasibility and information for routing the services. This will enable the system to include the impact on photonic characteristics before a service can be delivered on the path.

Exemplary Node and Controller

Referring to FIG. 6, in an exemplary embodiment, a block diagram illustrates an exemplary node 600 for use with the methods and systems described herein. In an exemplary embodiment, the exemplary node 600 can be a network element that may consolidate the functionality of a multi-service provisioning platform (MSPP), digital cross connect (DCS), Ethernet and/or Optical Transport Network (OTN) switch, dense wave division multiplexed (DWDM) platform, etc. into a single, high-capacity intelligent switching system providing Layer 0, 1, and/or 2 consolidation. In another exemplary embodiment, the node 600 can be any of an OTN add/drop multiplexer (ADM), a multi-service provisioning platform (MSPP), a digital cross-connect (DCS), an optical cross-connect, an optical switch, a router, a switch, a wavelength division multiplexing (WDM) terminal, an access/aggregation device, etc. That is, the node 600 can be any digital system with ingress and egress digital signals and switching therebetween of channels, timeslots, tributary units, etc. utilizing OTN, etc. While the node 600 is generally shown as an optical network element, the systems and methods contemplated for use with any switching fabric, network element, or network based thereon.

In an exemplary embodiment, the node 600 includes common equipment 610, one or more line modules 620, and one or more switch modules 630. The common equipment 610 can include power; a control module; operations, administration, maintenance, and provisioning (OAM&P) access; user interface ports; and the like. The common equipment 610 can connect to a management system 650 through a data communication network 660 (as well as a PCE, SDN controller, OpenFlow controller, etc.). The management system 650 can include a network management system (NMS), element management system (EMS), or the like. Additionally, the common equipment 610 can include a control plane processor configured to operate the control plane 140 as described herein. The node 600 can include an interface 670 for communicatively coupling the common equipment 610, the line modules 620, and the switch modules 630 therebetween. For example, the interface 670 can be a backplane, mid-plane, a bus, optical or electrical connectors, or the like. The line modules 620 are configured to provide ingress and egress to the switch modules 630 and external to the node 600. In an exemplary embodiment, the line modules 620 can form ingress and egress switches with the switch modules 630 as center stage switches for a three-stage switch, e.g. a three stage Clos switch. Other configurations and/or architectures are also contemplated. The line modules 620 can include optical transceivers, such as, for example, 1 Gb/s (GbE PHY), 2.5 Gb/s (OC-48/STM-1, OTU1, ODU1), 10 Gb/s (OC-192/STM-64, OTU2, ODU2, 10GbE PHY), 40 Gb/s (OC-768/STM-256, OTU3, ODU3, 40 GbE PHY), 100 Gb/s (OTU4, ODU4, 100GbE PHY), ODUflex, etc.

Further, the line modules 620 can include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s, N×1.25 Gb/s, and any rate in between. The line modules 620 can include wavelength division multiplexing interfaces, short reach interfaces, and the like, and can connect to other line modules 620 on remote network elements, end clients, edge routers, and the like. From a logical perspective, the line modules 620 provide ingress and egress ports to the node 600, and each line module 620 can include one or more physical ports. The switch modules 630 are configured to switch channels, timeslots, tributary units, etc. between the line modules 620. For example, the switch modules 630 can provide wavelength granularity (Layer 0 switching), SONET/SDH granularity such as Synchronous Transport Signal-1 (STS-1) and variants/concatenations thereof (STS-n/STS-nc), Synchronous Transport Module level 1 (STM-1) and variants/concatenations thereof, Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), ODTUGs, etc.; Ethernet granularity; Digital Signal n (DSn) granularity such as DS0, DS1, DS3, etc.; and the like. Specifically, the switch modules 630 can include both Time Division Multiplexed (TDM) (i.e., circuit switching) and packet switching engines. The switch modules 630 can include redundancy as well, such as 1:1, 1:N, etc. In an exemplary embodiment, the switch modules 630 provide OTN switching and/or Ethernet switching.

Those of ordinary skill in the art will recognize the node 600 can include other components which are omitted for illustration purposes, and that the systems and methods described herein are contemplated for use with a plurality of different network elements with the node 600 presented as an exemplary type of network element. For example, in another exemplary embodiment, the node 600 may not include the switch modules 630, but rather have the corresponding functionality in the line modules 620 (or some equivalent) in a distributed fashion. For the node 600, other architectures providing ingress, egress, and switching therebetween are also contemplated for the systems and methods described herein. In general, the systems and methods described herein contemplate use with any network element providing switching of OTN channels, timeslots, tributary units, wavelengths, etc. Furthermore, the node 600 is merely presented as one exemplary node 600 for the systems and methods described herein. Further the WDM functionality can be included in the node 600 or in a separate node.

Figure 7:
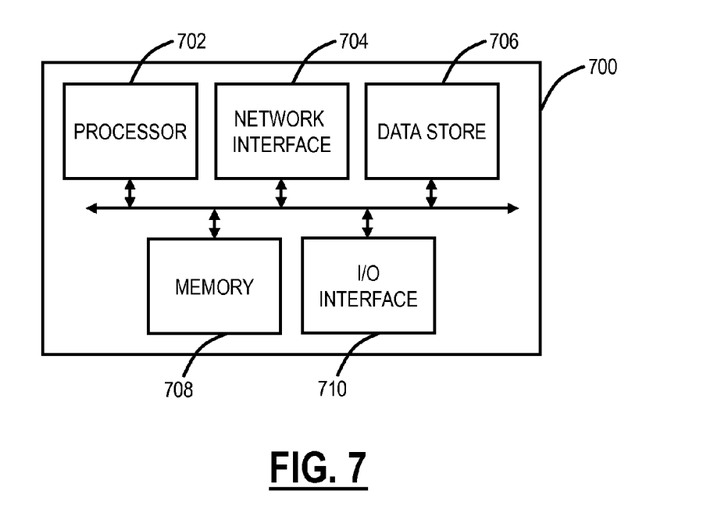
FIG. 7 is a block diagram of a controller to provide control plane processing and/or operations, administration, maintenance, and provisioning (OAM&P) for the node of FIG. 6.

Referring to FIG. 7, in an exemplary embodiment, a block diagram illustrates a controller 700 to provide control plane processing and/or operations, administration, maintenance, and provisioning (OAM&P) for the node 600. The controller 700 can be part of common equipment, such as common equipment 610 in the node 600, or a stand-alone device (e.g., a PCE) communicatively coupled to the node 600 via the DCN 660. The controller 700 can include a processor 702 which is hardware device for executing software instructions such as operating the control plane. The processor 702 can be any custom made or commercially available processor, a central processing unit (CPU), an auxiliary processor among several processors associated with the controller 700, a semiconductor-based microprocessor (in the form of a microchip or chip set), or generally any device for executing software instructions. When the controller 700 is in operation, the processor 702 is configured to execute software stored within memory, to communicate data to and from the memory, and to generally control operations of the controller 700 pursuant to the software instructions. The controller 700 can also include a network interface 704, a data store 706, memory 708, an I/O interface 710, and the like, all of which are communicatively coupled therebetween and with the processor 702.

The network interface 704 can be used to enable the controller 700 to communicate on the DCN 660, such as to communicate control plane information to other controllers, to the management system 650, and the like. The network interface 704 can include, for example, an Ethernet card (e.g., 10BaseT, Fast Ethernet, Gigabit Ethernet) or a wireless local area network (WLAN) card (e.g., 802.11a/b/g). The network interface 704 can include address, control, and/or data connections to enable appropriate communications on the network. The data store 706 can be used to store data, such as control plane information, provisioning data, OAM&P data, etc. The data store 706 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 706 can incorporate electronic, magnetic, optical, and/or other types of storage media. The memory 708 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 708 may incorporate electronic, magnetic, optical, and/or other types of storage media. Note that the memory 708 can have a distributed architecture, where various components are situated remotely from one another, but may be accessed by the processor 702. The I/O interface 710 includes components for the controller 700 to communicate to other devices. Further, the I/O interface 710 includes components for the controller 700 to communicate with the other nodes, such as using overhead associated with OTN signals.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for coordination between a data control plane and photonic control in a network, comprising:
operating the data control plane with photonic control messaging included therein, wherein the data control plane is configured to at least establish end-to-end paths between a plurality of network elements at Layer 1;
transmitting a photonic control message in or by the data control plane responsive to a requirement for photonic layer information;
processing, via the data control plane, the photonic layer information received from photonic control responsive to the photonic control message, wherein the photonic control is configured to automatically adjust photonic hardware responsive to a change at a photonic layer and re-tune the photonic hardware based on the change; and
performing an action by the data control plane considering the photonic layer information, wherein the data control plane is prevented from adding or removing one or more wavelengths where the photonic control is currently operating.

2. The method of claim 1, further comprising:
distributing the photonic layer information via the data control plane.

3. The method of claim 1, further comprising:
determining the requirement as one of protection path validation, redialing of different legs of a subnetwork connection protection (SNCP), and network integrity checking.

4. The method of claim 1, further comprising:
determining a path in the network is currently optically viable based a determination using the photonic layer information associated with the path; and
performing the action comprising adding or removing a wavelength on the path based on the path being currently optically viable.

5. The method of claim 1, further comprising:
determining a path in the network is not currently optically viable based on the photonic layer information; and
performing the action comprising preventing adding or removing a wavelength on the path based on the path not being currently optically viable.

6. The method of claim 1, further comprising:
pre-computing one or more protection paths for services managed by the data control plane; and
checking optical validity of the one or more protection paths prior to moving the services thereon.

7. The method of claim 1, wherein the requirement for photonic layer information is responsive to a failure in the network, and wherein the action is reversion to one or more links that are determined to be optically viable currently.

8. The method of claim 1, wherein the requirement for photonic layer information is responsive to a possible redial on a subnetwork connection protection (SNCP) leg, and wherein the action is redialing to the SNCP leg if it is determined to be optically viable currently.

9. The method of claim 1, wherein the requirement for photonic layer information is based on a periodic network integrity check, and wherein the action is rerouting one or more wavelengths on links determined to be saturated.

10. A system for coordination between a data control plane and photonic control in a network, comprising:
a processor communicatively coupled to memory; and
instructions stored in the memory that, when executed, cause the processor to:
operate the data control plane with photonic control messaging included therein, wherein the data control plane is configured to at least establish end-to-end paths between a plurality of network elements at Layer 1;
cause transmission of a photonic control message in or by the data control plane responsive to a requirement for photonic layer information;
process the photonic layer information received from photonic control responsive to the photonic control message, wherein the photonic control is configured to automatically adjust photonic hardware responsive to a change at a photonic layer and re-tune the photonic hardware based on the change; and
cause an action in the data control plane considering the photonic layer information, wherein the data control plane is prevented from adding or removing one or more wavelengths where the photonic control is currently operating.

11. The system of claim 10, wherein the instructions stored in the memory, when executed, further cause the processor to distribute the photonic layer information via the data control plane.

12. The system of claim 10, wherein the instructions stored in the memory, when executed, further cause the processor to
determine the requirement as one of protection path validation, redialing of different legs of a subnetwork connection protection (SNCP), and network integrity checking.

13. The system of claim 10, wherein the instructions stored in the memory, when executed, further cause the processor to determine a path in the network is currently optically viable based on the photonic layer information; and perform the action comprising adding or removing a wavelength on the path based on the path being currently optically viable.

14. The system of claim 10, wherein the instructions stored in the memory, when executed, further cause the processor to determine a path in the network is not currently optically viable based on the photonic layer information; and perform the action comprising preventing adding or removing a wavelength on the path based on the path not being currently optically viable.

15. The system of claim 10, wherein the instructions stored in the memory, when executed, further cause the processor to pre-compute one or more protection paths for services managed by the data control plane; and periodically check optical validity of the one or more protection paths and managing a status in the data control plane.

16. The system of claim 10, wherein the requirement for photonic layer information is responsive to a failure in the network, and wherein the action is reversion to one or more links that are determined to be optically viable currently.

17. The system of claim 10, wherein the requirement for photonic layer information is responsive to a possible redial on a subnetwork connection protection (SNCP) leg, and wherein the action is redialing to the SNCP leg if it is determined to be optically viable currently or preventing the redialing until the photonic layer information indicates the SNCP leg is optically viable.

18. The system of claim 10, wherein the requirement for photonic layer information is based on a periodic network integrity check, and wherein the action is rerouting one or more wavelengths on links determined to be saturated.

19. A network with coordination between a data control plane and photonic control, comprising:

a plurality of network elements collectively operating the data control plane there between, wherein the data control plane is configured to at least establish end-to-end paths between the plurality of network elements at Layer 1;

a plurality of links interconnecting the plurality of network elements at a photonic layer and with the photonic control operating thereon; and signaling in the data control plane for coordination with the photonic control, wherein the signaling is utilized to:

process photonic layer information received from the photonic control responsive to a photonic control message, wherein the photonic control is configured to automatically adjust photonic hardware responsive to a change at a photonic layer and re-tune the photonic hardware based on the change; and cause an action in the data control plane considering the photonic layer information, wherein the data control plane is prevented from adding or removing one or more wavelengths where the photonic control is currently operating.

* * * * *